United States Patent Office.

WILLIAM MARSDEN, OF NEWBURG, NEW YORK.

Letters Patent No. 103,761, dated May 31, 1870.

IMPROVED COMPOUND FOR CATTLE-FOOD.

The Schedule referred to in these Letters Patent and making part of the same.

*To all whom it may concern:*

Be it known that I, WILLIAM MARSDEN, of Newburg, in the county of Orange and State of New York, have invented a new and improved Compound for Cattle-Food; and I do hereby declare the following to be a full, clear, and exact description thereof, which will enable those skilled in the art to make and use the same.

This invention relates to a compound made chiefly of corn meal, St. John's bread, fenugreek, and gentian, to which may be added salt of prunelle, common salt, cinnamon, anis-seed, coriander-seed, tamarack, clover, and sugar.

These ingredients are mixed together about in the following proportion:

Corn meal, one hundred parts; St. John's bread, three parts; fenugreek, three parts; gentian, three parts; and, if the remaining ingredients are to be used, salt of prunelle, (saltpeter,) three-sixteenths parts; common salt, three parts; cinnamon, three parts; anis-seed, three parts; coriander-seed, three parts; tamarack, three parts; cloves, three parts; sugar, three parts.

In preparing my compound I reduce the several ingredients to a fine powder, by grinding or otherwise, and then I add them to the corn meal, and stir and agitate until the whole is thoroughly and uniformly mixed.

The powder thus obtained I mix with the common food of cattle, in any suitable proportion, to be determined by experience. In some cases I have mixed with ten pounds of common food one pound of my compound, and in other cases I have used my compound in greater or smaller proportion, but in all cases I have found that, by using my compound with the proper care and distinction, the condition and health of cattle are materially improved.

What I claim as new, and desire to secure by Letters Patent, is—

A compound for cattle-food, made of corn meal, St. John's bread, fenugreek, and gentian, mixed together substantially in the manner and about in the proportion herein set forth.

Also, a compound made of all of the ingredients herein named, and mixed together substantially as and about in proportion specified.

This specification signed by me this 28th day of April, 1870.

WM. MARSDEN.

Witnesses:
W. HAUFF,
E. F. KASTENHUBER.